United States Patent Office 2,944,071
Patented July 5, 1960

2,944,071
ACYL HYDRAZINES

Arsenio A. Pessolano, Colonia, and Robert L. Clark, Woodbridge, N.J., assignors to Merck & Co., Inc., Rahway, N.J., a corporation of New Jersey No Drawing. Filed Oct. 15, 1957, Ser. No. 690,220

9 Claims. (Cl. 260—404.5)

This invention relates to substituted hydrazines. In one of its more particular aspects, this invention relates to hydrazides of substituted hydracrylic acids.

The compounds of this invention are N,N'-substituted hydrazines wherein one of the substituents is the acyl radical of β,β-diphenylhydracrylic acid and the other substituent is another acyl radical. These compounds may be represented by the general formula

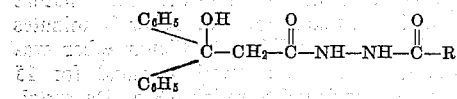

wherein R represents a hydrogen atom or an alkyl, aryl, aralkyl, alkaryl or heterocyclic radical. Each of these radicals may be substituted or unsubstituted and, in the case of those radicals containing alkyl moieties, may be either straight chain or branched chain radicals.

The compounds of this invention can be used as anticonvulsants without causing sedation and are also useful as potentiators of barbiturate anesthesia.

These novel compounds are prepared by reacting β,β-diphenylhydracrylic acid hydrazide with an acylating agent. The reaction is conducted in an organic base, with or without heat, or in a neutral solvent such as benzene at room temperature.

The starting material for the preparation of the compounds of this invention, N-(3,3-diphenyl-3-hydroxypropionyl) hydrazine, may be prepared by the reaction of esters of 3,3-diphenyl-3-hydroxypropionic acid with hydrazine. The propionic acid esters may be prepared in turn by a Reformatsky reaction utilizing benzophenone, an ester of an α-halo acetic acid such as ethyl bromoacetate, and zinc. These reactions may be indicated by the following sequence of equations:

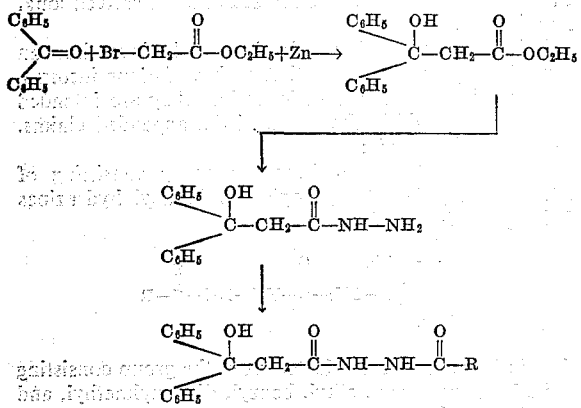

The preparation of the compounds of this invention from N-(3,3-diphenyl-3-hydroxypropionyl) hydrazine may be accomplished by the use of any convenient acylating agent, such as an acyl halide or an acid anhydride. The reaction is advantageously conducted by bringing together N-(3,3-diphenyl-3-hydroxypropionyl) hydrazine and the acylating agent in the presence of a suitable solvent. In order to control the course of the reaction it is frequently desirable to cool the reaction mixture during the addition of the reactants.

The reaction may be conducted in an organic base which is a solvent for the starting material. Suitable organic bases are in general tertiary amines, for example, triethylamine, pyridine, quinoline and the like. The organic base functions to remove any hydrogen chloride which is formed in the reaction, and the use of a base as a solvent permits higher temperatures to be utilized in the reaction. The reaction may be conducted at room temperature or at elevated temperatures if desired. The use of elevated temperatures is readily accomplished by means of a steam bath to heat the reaction mixture.

The reaction may also be conducted in a neutral solvent. For this purpose, the reaction may be advantageously run at room temperatures in a substantially neutral, non-polar solvent such as hydrocarbon solvents of from about the $C_6$–$C_{10}$ range which may either be straight chain or branched chain hydrocarbons, aromatic hydrocarbons such as benzene, toluene and xylene, chlorinated hydrocarbons of the same range as the unsubstituted hydrocarbons, cyclohexane and other cycloaliphatic hydrocarbons, ether and other similar solvents.

The products are recovered as crystalline materials and may be purified by standard recrystallization techniques.

The invention may be better understood by reference to the following examples which are included for purposes of illustration and are not intended to be in any way limiting to the scope of the instant invention.

EXAMPLE 1

N-(3,-3-diphenyl-3-hydroxypropionyl) N'-acetyl hydrazine

To 700 ml. of dry benzene was added 182 g. of benzophenone and 80 g. of freshly cleaned zinc granules, 20–30 mesh. The mixture was stirred rapidly and heated to reflux. A solution of 185 g. of ethyl bromoacetate in 300 ml. of dry benzene was then added to the mixture over a period of 2 hours, keeping the reaction mixture at gentle reflux during the addition. The resulting mixture was refluxed for another 3 hours and then cooled in ice and treated with a solution of 200 ml. of concentrated sulfuric acid and 1,000 ml. of water by adding the solution dropwise over a period of 1 hour. Ether was added and the organic layer was separated, washed with water and sodium bicarbonate solution, dried over magnesium sulphate and evaporated. Petroleum ether was then added to the residue and 179 g. of ethyl 3,3-diphenyl-3-hydroxypropionate in the form of needles having a melting point of 77–80° C. was obtained.

This material was converted to the hydrazide without further purification as follows:

A mixture of 60 g. of the crude ethyl 3,3-diphenyl-3-hydroxypropionate and 120 ml. of 85% hydrazine hydrate was heated on a steam bath for 1 hour. The reaction mixture was cooled and the hydrazide crystallized as white rods. The product N-(3,3-diphenyl-3-hydroxypropionyl) hydrazine was obtained in a yield of 54.3 g. and was found to have a melting point of 130–131° C. This product and the product of additional runs was used in the preparation of N-(3,3-diphenyl-3-hydroxypropionyl) N'-acetyl hydrazine as follows:

To 425 ml. of acetic anhydride maintained below 30° C. was added in portions 125 g. of N-(3,3-diphenyl-3-hydroxypropionyl) hydrazine. As the product began to crystallize toward the end of the addition, 1,000 ml. of ether was added to facilitate stirring. The resulting thick suspension was stirred for 1½ hours and then the solid N-(3,3-diphenyl-3-hydroxypropionyl) N'-acetyl hydrazine was removed by filtration. The product was obtained in a yield of 125 g. Recrystallization from absolute ethanol yielded a product having a melting point of 161–162° C.

For the sake of convenience, in the following examples N-(3,3-diphenyl-3-hydroxypropionyl) hydrazine will be referred to as the starting material.

EXAMPLE 2

*N-(3,3-diphenyl-3-hydroxypropionyl) N'-isocaproyl hydrazine*

In 15 ml. of pyridine was dissolved 2.56 g. of the starting material, and 1.40 g. of isocaproyl chloride was added to the solution. The solution was heated on a steam bath for 15 minutes. Water was added and an oil was formed. The aqueous layer was decanted and the oil taken up in ether-benzene, washed with water, dried and evaporated. The solid weighed 3.0 g. It was dissolved in 9 ml. of methanol and 1 ml. of water was carefully added to the warm solution. The product crystallized as needles having a melting point of 131–132° C.

EXAMPLE 3

*N-(3,3-diphenyl-3-hydroxypropionyl) N'-lauroyl hydrazine*

In 15 ml. of pyridine was dissolved 2.56 g. of starting material. To this solution was added 2.25 g. of lauroyl chloride. The reaction mixture was heated on a steam bath for 15 minutes and 100 ml. of water was added to precipitate the product. An oil formed which slowly solidified. The solid was collected and weighed 4 g. Upon recrystallization from absolute ethanol there were obtained small white crystals having a melting point of 104–105° C.

EXAMPLE 4

*N-(3,3-diphenyl-3-hydroxypropionyl) N'-myristoyl hydrazine*

To a solution of 2.56 g. of starting material in 15 ml. of pyridine was added 2.50 g. of myristoyl chloride. The reaction mixture was heated on a steam bath for 15 minutes, cooled and then 100 ml. of water was added. An oil formed which solidified on rubbing. The solid was collected and weighed 4.5 g. The solid product was dissolved in 35 ml. of absolute ethanol, filtered through Supercel and 3 ml. of water added to the warm solution. Small round white crystals having a melting point of 107–109° C. were collected.

EXAMPLE 5

*N-(3,3-diphenyl-3-hydroxypropionyl) N'-palmitoyl hydrazine*

To 15 ml. of dry pyridine was added 1.28 g. of starting material and 1.40 g. of palmitoyl chloride. The reaction mixture was heated on a steam bath for 30 minutes, cooled and water added to produce a gummy precipitate. The product was filtered and taken up in 50 ml. of warm absolute ethanol and carefully diluted with water. The white solid which crystallized was collected and weighed 1.6 g. Recrystallization from absolute ethanol gave a crop of small round white crystals having a melting point of 109–111° C.

EXAMPLE 6

*N-(3,3-diphenyl-3-hydroxypropionyl) N'-phenylacetyl hydrazine*

To 50 ml. of dry benzene was added 5.0 g. of starting material and 3.09 g. of phenylacetyl chloride. The hydrazine gradually went into solution and the reaction mixture became warm with the evolution of hydrogen chloride. Several minutes after there was complete solution, a white solid began to crystallize. Petroleum ether was added and the solid was found to weigh 6.8 g. The solid was taken up in 20 ml. of warm absolute ethanol and crystallized as small hard needles. Recrystallization from dilute ethanol gave plates having a melting point of 133–134° C.

EXAMPLE 7

*N-(3,3-diphenyl-3-hydroxypropionyl) N'-diphenylacetyl hydrazine*

To 50 ml. of dry benzene was added 4.4 g. of starting material and 4.0 g. of diphenylacetyl chloride. A nearly homogeneous solution formed and then small white needles began to crystallize. The reaction mixture became slightly warm, hydrogen chloride was evolved and the reaction mixture solidified. Ether was added and 6.8 g. of solid was collected. The solid was recrystallized from absolute ethanol to give a crop of small white crystals with a melting point of 174–175° C.

EXAMPLE 8

*N-(3,3-diphenyl-3-hydroxypropionyl) N'-benzoyl hydrazine*

To 50 ml. of benzene was added 5.0 g. of starting material and 2.82 g. of benzoyl chloride. The mixture became warm and a new solid formed. After 10 minutes the reaction mixture was solid. Petroleum ether was added and the mixture was allowed to stand for 15 minutes. The solid was found to weigh 6.3 g. Recrystallization from absolute ethanol gave a crop of white crystals having a melting point of 158–159° C.

Other N-(3,3-diphenyl-3-hydroxypropionyl) N'-acyl hydrazines which may be prepared in a manner similar to the above examples include the N'-propionyl, N'-butyryl, N'-pentanoyl and similar alkanoyl hydrazines. In addition, compounds such as N-(3,3-diphenyl-3-hydroxypropionyl) N'-naphthoyl hydrazine and the N'-cinnamoyl, N'-thenoyl, N'-nicotinoyl, N'-toluyl and other acyl hydrazines of the aroyl, aralkanoyl and alkaroyl series, as well as hydrazines substituted with a heterocyclic acyl radical may be similarly prepared.

The novel compounds of the instant invention are effective anti-convulsants and barbiturate potentiators when taken orally and may therefore be administered in the form of capsules or tablets. The capsules should contain about 0.25 g. to about 0.50 g. of the pure N-(3,3-diphenyl-3-hydroxypropionyl) N'-acyl hydrazine. The tablets should contain approximately 0.25 g. to about 0.50 g. of the pure acyl hydrazines as well as a small amount of a lubricant such as magnesium stearate and a disintegrating agent such as cornstarch. The compounds of this invention may also be utilized in other conventional formulations.

Various changes and modifications of the invention can be made, and to the extent that such variations incorporate the spirit of the instant invention, they are intended to be included within the scope of the appended claims.

What is claimed is:

1. A product selected from the group consisting of N-(3,3-diphenyl-3-hydroxypropionyl) N'-acyl hydrazines of the general fromula

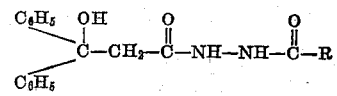

wherein R is a member selected from the group consisting of the hydrogen atom, alkyl, benzyl, diphenylmethyl, and phenyl radicals.

2. N-(3,3-diphenyl-3-hydroxypropionyl) N'-acetyl hydrazine.

3. N-(3,3-diphenyl-3-hydroxypropionyl) N'-isocaproyl hydrazine.

4. N-(3,3-diphenyl-3-hydroxypropionyl) N'-lauroyl hydrazine.

5. N-(3,3-diphenyl-3-hydroxypropionyl) N'-myristoyl hydrazine.
6. N-(3,3-diphenyl-3-hydroxypropionyl) N'-palmitoyl hydrazine.
7. N-(3,3-diphenyl-3-hydroxypropionyl) N'-phenylacetyl hydrazine.
8. N-(3,3-diphenyl-3-hydroxypropionyl) N'-diphenylacetyl hydrazine.
9. N-(3,3-diphenyl-3-hydroxypropionyl) N'-benzoyl hydrazine.

References Cited in the file of this patent

UNITED STATES PATENTS 2,765,304    Siegrist et al. _____ Oct. 2, 1956

OTHER REFERENCES

Curtius: J. Prakt. Chem. [2], vol. 95 (1917), p. 199.
Chem. Abstracts, vol. 5, p. 3572 (1911), citing J. Prakt. Chem. [2], vol. 83, pp. 513–540 (1905).
Chem. Abstracts, vol. 28, p. 5441 (1934) citing Acta Acad. Aboensis Math et Phys., vol. 6, #12 Aspelund, 15 pages (1932).
Chem. Abstracts, vol. 48, p. 5189 (1954), citing Rend. seminar fac sci univ. Cagliari, vol. 22, pp. 78–80 (1952), Paggi et al.
J. Prakt. Chem. [2], vol. 95, p. 205 (1917) (Curtius), Beilstein, 4th ed., vol. IX, 1st suppl., p. 153 (1932).